(12) United States Patent
Rosan

(10) Patent No.: US 10,207,428 B2
(45) Date of Patent: Feb. 19, 2019

(54) SYSTEM FOR MOLDING PLASTIC MATERIALS

(75) Inventor: Arnon Rosan, New York, NY (US)

(73) Assignee: Signature Systems Group, LLC, Flower Mound, TX (US)

( * ) Notice: Subject to any disclaimer, the term of this patent is extended or adjusted under 35 U.S.C. 154(b) by 1100 days.

(21) Appl. No.: 13/605,524

(22) Filed: Sep. 6, 2012

(65) Prior Publication Data

US 2014/0061960 A1    Mar. 6, 2014

(51) Int. Cl.
*B29C 31/06* (2006.01)
*B29C 31/10* (2006.01)
(Continued)

(52) U.S. Cl.
CPC ............ *B29C 31/06* (2013.01); *B29C 31/042* (2013.01); *B29C 31/10* (2013.01); *B29C 47/92* (2013.01); *B29C 31/047* (2013.01); *B29C 45/13* (2013.01); *B29C 2043/046* (2013.01); *B29C 2043/3433* (2013.01); *B29C 2043/5875* (2013.01); *B29C 2045/279* (2013.01); *B29C 2947/926* (2013.01);
(Continued)

(58) Field of Classification Search
CPC ..... B29C 31/042; B29C 31/047; B29C 31/06; B29C 2045/279; B29C 45/13; B29C 2043/046; B29C 2043/3433; B29C 2043/5875; B29C 33/34
USPC ..... 264/297.2, 297.3, 297.6–297.8; 425/256, 425/257, 259, 261
See application file for complete search history.

(56) References Cited

U.S. PATENT DOCUMENTS

| 2,347,117 A | * | 4/1944 | Luxenberger | ......... B29C 44/428 |
| | | | | 236/86 |
| 2,481,486 A | * | 9/1949 | Abbott | ..................... B28B 5/08 |
| | | | | 162/407 |

(Continued)

FOREIGN PATENT DOCUMENTS

| AT | 398941 B | * | 2/1995 | ......... B29C 44/3419 |
| JP | 10100212 A | * | 4/1998 | ............. B29C 45/13 |

OTHER PUBLICATIONS

International Searching Authority; International Search Report and Written Opinion of the International Searching Authority; International Application No. PCT/US2013/58130; Patent Cooperation Treaty; pp. 1-10; publisher United States Patent Office; Published Alexandria, Virginia, USA; copyright and mailing date Jan. 16, 2014; (10 pages).

*Primary Examiner* — Atul P. Khare
(74) *Attorney, Agent, or Firm* — Mets Lewis Brodman Must O'Keefe LLC

(57) ABSTRACT

A material handling and mold filling system is provided which directs the flow of molten plastic material from an extruder and allocates the molten material to a plurality of nozzles through the use of independently operated, variable valves. The system therefore provides independent streams of molten plastic material having variable temperatures and flow rates or volumes to particular sections or regions of the mold. This independent temperature or flow of molten plastic material facilitates the complete, rapid and accurate filling of the molds, reducing turbulence and other temperature or flow-related imperfections in the finished components. A multiphase material handling system is also disclosed for expeditious sequential and simultaneous filling and pressing of the mold and extracting the completed component from the system.

21 Claims, 5 Drawing Sheets

(51) Int. Cl.
  *B29C 31/04* (2006.01)
  *B29C 47/92* (2006.01)
  *B29C 43/58* (2006.01)
  *B29C 45/13* (2006.01)
  *B29C 43/34* (2006.01)
  *B29C 43/04* (2006.01)
  *B29C 45/27* (2006.01)

(52) U.S. Cl.
  CPC ............... *B29C 2947/92104* (2013.01); *B29C 2947/92209* (2013.01); *B29C 2947/92409* (2013.01); *B29C 2947/92704* (2013.01); *B29C 2947/92904* (2013.01)

(56) References Cited

U.S. PATENT DOCUMENTS

| | | | | |
|---|---|---|---|---|
| 2,581,579 | A * | 1/1952 | Davis | B28B 5/04 |
| | | | | 425/159 |
| 2,713,709 | A * | 7/1955 | Wright | B28B 5/022 |
| | | | | 425/204 |
| 3,103,254 | A * | 9/1963 | Stedman | B28B 1/52 |
| | | | | 106/625 |
| 3,720,738 | A * | 3/1973 | Munk | B30B 15/302 |
| | | | | 264/109 |
| 3,794,152 | A * | 2/1974 | Reyland | B22C 25/00 |
| | | | | 198/427 |
| 3,868,209 | A * | 2/1975 | Howell | B29C 43/34 |
| | | | | 264/545 |
| 4,238,181 | A | 12/1980 | Dannels et al. | |
| 4,698,001 | A * | 10/1987 | Vismara | A42B 3/128 |
| | | | | 425/134 |
| 4,950,145 | A * | 8/1990 | Zanetos | A23G 1/205 |
| | | | | 141/157 |
| 4,961,888 | A * | 10/1990 | Brown | B29C 31/04 |
| | | | | 198/570 |
| 5,407,342 | A | 4/1995 | Boucher et al. | |
| 5,800,846 | A * | 9/1998 | Hart | B29C 51/46 |
| | | | | 425/150 |
| 6,015,512 | A * | 1/2000 | Yang | B29C 43/021 |
| | | | | 264/2.2 |
| 6,132,669 | A * | 10/2000 | Valyi | B29C 31/042 |
| | | | | 264/266 |
| 6,245,415 | B1 | 6/2001 | Keller et al. | |
| 6,328,549 | B1 * | 12/2001 | Valyi | B29C 31/042 |
| | | | | 425/112 |
| 6,383,428 | B1 * | 5/2002 | Ellison | B29C 31/045 |
| | | | | 264/108 |
| 6,440,524 | B2 * | 8/2002 | Valyi | B29C 31/042 |
| | | | | 428/189 |
| 6,554,604 | B1 | 4/2003 | Schmidt | |
| 6,637,497 | B2 * | 10/2003 | Herron | A23G 1/206 |
| | | | | 141/113 |
| 6,719,551 | B2 | 4/2004 | Polk, Jr. | |
| 6,852,268 | B1 * | 2/2005 | Valyi | B29C 31/044 |
| | | | | 264/246 |
| 6,869,558 | B2 | 3/2005 | Polk, Jr. | |
| 6,900,547 | B2 | 5/2005 | Polk, Jr. | |
| 7,208,219 | B2 | 4/2007 | Polk, Jr. | |
| 7,779,595 | B2 | 8/2010 | Polk, Jr. | |
| 7,837,917 | B2 | 11/2010 | Polk, Jr. | |
| 7,842,225 | B2 | 11/2010 | Polk, Jr. | |
| 7,842,226 | B2 | 11/2010 | Polk, Jr. | |
| 7,923,095 | B2 | 4/2011 | Polk, Jr. | |
| 7,931,845 | B2 | 4/2011 | Polk, Jr. | |
| 7,955,550 | B2 | 6/2011 | Polk, Jr. | |
| 7,980,042 | B2 * | 7/2011 | Polk, Jr. | B29C 31/047 |
| | | | | 403/252 |
| 8,070,471 | B2 | 12/2011 | Polk, Jr. | |
| 8,167,605 | B2 * | 5/2012 | Linares | B29C 45/0084 |
| | | | | 425/125 |
| 2002/0017742 | A1 * | 2/2002 | Kikuchi | B29B 17/0042 |
| | | | | 264/333 |
| 2002/0084543 | A1 | 7/2002 | Buja | |
| 2003/0127765 | A1 * | 7/2003 | Weiland | B29C 31/045 |
| | | | | 264/69 |
| 2003/0197296 | A1 | 10/2003 | Krassilnikov | |
| 2006/0159793 | A1 | 7/2006 | Hahn et al. | |
| 2007/0108668 | A1 | 5/2007 | Hutchinson et al. | |
| 2010/0230861 | A1 * | 9/2010 | Richardson | B29B 17/0026 |
| | | | | 264/331.13 |
| 2011/0097489 | A1 | 4/2011 | Kerr et al. | |
| 2011/0193253 | A1 | 8/2011 | Polk et al. | |
| 2011/0277926 | A1 | 11/2011 | Polk, Jr. | |

\* cited by examiner

SYSTEM FOR MOLDING PLASTIC MATERIALS

BACKGROUND OF THE INVENTION

Field of the Invention

The present invention relates to a plastic molding apparatus and method. More particularly, the present invention relates to a suspended multi-port flow controller and apparatus which dispenses and disperses molten plastic material in a preselected manner to facilitate complete and rapid filling of an open product mold.

Description of the Prior Art

Molded plastic components are generally formed by creating a mold having a hollow cavity of the desired configuration. The mold sections may be opened and the lower portion may be filled with molten plastic material in the form of a fillet, or the mold may closed and the molten plastic material injected into the mold. The molten material may be injected under pressure, such as in injection molding; pressed within a split mold, such as in compression molding; or drawn by vacuum into the mold, such as in vacuum forming, for final shaping and cooling into the finished component. Each of these techniques requires certain physical characteristics of the plastic delivery method, mold and molten fill material. Typically, the molten plastic material is provided by the use of an injection molding machine or plastic extruder, which converts solid raw plastic pellets to a web of molten material. The plastic pellets, which may be homogeneous or heterogeneous, are combined, as necessary, in various combinations and ratios to form the desired molding material. Depending on the molding material components and the characteristics of the delivery method or mold, the web of molten material may be maintained within a variety of temperature and viscosity parameters. It is important that these parameters be continuously monitored and maintained to ensure even flow of the material and comprehensive filling of the mold. Additionally, the characteristics and performance of the finished part are closely related to the flow rate of the molding material, the method of delivery of this material into the mold, plastic and mold temperatures, the cooling period in the mold and a variety of other processing parameters. In a traditional injection molding process molten material is injected under pressure into a closed mold. Because of the high pressures required, it is often too expensive or impractical to produce large, voluminous or very heavy parts using this method. In a traditional compression molding process a fillet or other plastic charge may be placed into an open tool in a molten or solid state and pressure and/or heat applied accordingly until the part is formed. Plastic pellets may also be placed directly into the compression molding tool in raw form, heated in the tool while under pressure, and formed under pressure into the desired part. The pellet method is relatively slow, in that material must be heated in the mold at the same time compression occurs and subsequently, the mold must be cooled from its heated state to allow forming of the part under pressure. The fillet method is slow as well, since the fillet must be generated by an extruder in advance of placement in the tool and delivery of the fillet into the mold is generally manual or minimally mechanized. Additionally, use of a single or even multiple fillets, which must be compressed across the face of the mold, can result in built in material stresses because of the distance within the mold that molten material must be shifted during its curing and compression.

One of the most significant shortcomings of these prior molding methods relates to these stresses. Once the plastic material begins to set or cure, it creates a base physical configuration formed by the molecular bonds within the material. The plastic material will therefore always have a tendency to return to the base configuration. Forming the component after the cure process has begun will therefore create internal stress within the component, as it is deformed away from the base configuration. This may lead to lack of structural integrity or subsequent warping, shrinkage or other deformation as the component seeks to return to the base configuration which may be exacerbated under certain environmental conditions. As such, it is important that material remain adequately molten and viscous during its flow and forming process.

Additionally, the area where two fillets may meet and combine or a single fillet overlaps during the compression and cooling process can be a structural weak point, as the discrete material may not combine or integrate fully, even under high pressure. Higher pressures are generally required for higher distances that the fillet must be dispersed or for higher volumes of material that must be moved within the mold to its final destination for part formation.

Polk, Jr., U.S. Pat. No. 6,719,551, issued Apr. 13, 2004, and Polk, Jr., et al., U.S. Pat. No. 6,869,558, issued Mar. 22, 2005, describe a thermoplastic molding process and apparatus which includes an adjustable die gate member for independently controlling flow of molten plastic material into portions of an open mold. In these references, an extruder provides a web of molten plastic material directly to a multi-segment gated die which controls the flow of the molten material over an open mold. The mold is on a movable trolley and moves, relative to the gated die in a longitudinal manner along a preset path, such as a conveyor or track. The extruder provides a continuous flow of molten material to the multi-segment gated die, which contains a plurality of independently controlled flow gates. Each gate may be raised or lowered in order to enhance or retard the flow of molten plastic material therethrough. The gates are arranged laterally across the flow path of the molten plastic web, which flow path corresponds to the width dimension of the mold. The gated die is positioned above the mold travel path, which is perpendicular to the lateral arrangement of the gates of the die. In this manner, the flow of the web of molten material is passed through the open gates of the die and downwardly to the mold moving below. As the mold is displaced longitudinally along its travel path, the web of molten material flows over it, similar to a waterfall, filling the mold in the width dimension through the flow of the gates and in the length dimension by the longitudinal displacement of the mold relative to the gates. Through the sequential, preselected opening and closing of the gates, a web profile may be created which corresponds to any upstanding or depressed features of the mold. In this manner, lateral sections of the molten web material flow in volumes corresponding to the localized capacity of the mold sections. For example, to the extent the mold has a significant depression in one section, the corresponding gates may be opened more fully while that section of the mold passes thereunder, or the speed of the molds travel longitudinally may be slowed. This allows relatively more molten material to flow into that particular section of the mold than while the mold is moving at a steady pace. This reduces the need for molten material to flow from other parts of the mold in order to fill the large, open space. This segmented filling enhances the ability of the mold to be filled quickly and evenly, with a reduced chance of incomplete or uneven filling. This improves the speed of the molding process, as well as the quality of the finished component from a structural standpoint.

The Polk process is particularly adapted for flow of molten web materials of higher viscosities. The particular arrangement of the gates in a lateral orientation experiences reduced effectiveness as the viscosity of the web of molten material is decreased, based upon the nature of the flow gates. Furthermore, material begins to cure immediately upon being deposited into the open tool and as a result of its exposure to ambient air, the plastic material deposited earlier in the deposit cycle will be at a different temperature, viscosity and/or state of cooling during its compression, thus reducing the controllability of the process and the quality of the final part. Moreover, the system as described requires the use of some type of conveyor or transport system to displace the mold during the molding process.

Polk discusses the direct coupling of an extruder to an adjustable die gate member. These embodiments require that material flow through the die gate apparatus and into the open mold, generally at the rate of extrusion. This limits the material being deposited to no faster than the rate of extrusion. This results in longer cycle times than necessary to compress the component, as well as a longer time for plastic to cool, begin setting and lose viscosity before being compressed.

There remains a need, therefore, for a process and apparatus for more comprehensive and variable control of the flow of molten plastic material through the delivery apparatus and over the mold, especially in the event that the mold has a large proportion of varying depths or other complexities and for a more uniform material dispersion process that does not rely upon the movement of an open mold longitudinally during the filling step. There also remains a need for a method and apparatus that allows for intra-compression-cycle accumulation and storing of to-be-deposited plastic material in a molten state, thus allowing for the more consistent and rapid deposit of material into the open mold. This minimizes the delay from the start of material deposit until the material fill has been completed and the mold is ready to be compressed.

SUMMARY OF THE INVENTION

A material delivery, mold filling and compression molding system is provided that allows for the efficient melting, flow, and delivery of molten plastic material into an open mold section, and for the compression of the material into the desired part. The apparatus and system is controlled by a central controller which integrates the various components of the system and allows for a fine level of control over the process and the system.

The apparatus incorporates a manifold unit designed to receive molten plastic material from an extruder and deliver it through multiple channels or conduits within the manifold to a series of ports, in the form of, e.g., nozzles or gates located on the manifold. A reservoir, or accumulator, may positioned intermediate to said extruder and said manifold to retain molten plastic material in between filling cycles at an appropriate temperature. This material is then dispensed in a controlled manner to a mold positioned underneath the manifold unit. The manifold may include a preselected number of tubes, channels, heating elements, nozzles and/or gates, depending on the desired configuration of the manifold, the type of plastic material to be utilized, and the design of the parts to be molded. Depending on the complexity or size of the part to be molded, additional gates or nozzles may be added to the manifold to increase its size, or the density of the manifold nozzle outputs can be increased to increase the precision of the molten plastic delivery of the system.

The accumulator is provided for temporary, controlled temperature storage of the molten plastic material after emerging from the extruder and prior to entry into the integrated manifold. By its nature, the extruder is a continuous process, while the use of the accumulator and integrated manifold is a batch process. The accumulation device is utilized for storage of molten plastic material which would otherwise begin setting if not properly contained or which would have no place to be stored during the compression cycle. When the control system senses that an empty mold is in position and ready to receive material, it triggers the accumulator to deliver material from storage in the accumulator, through any of a variety of well known delivery systems, such as a hydraulic or pneumatic piston, into and through the manifold system and the open valve nozzles.

The use of multiple nozzles allows for independent flow of molten plastic material from each nozzle and down to the mold face in varying amounts and/or rates. This independent flow of molten plastic material facilitates the complete, rapid, simultaneous and accurate filling of the molds. A plurality of nozzles are positioned above a mold, with a nozzle density selected based upon the degree of control necessary to fill the mold and to provide rapid and even filling. This reduces the need for lateral flow of molten plastic material from high surface features to low surface features under pressure and minimizes the distances that the molten plastic material must travel within the mold, while under pressure during the compression cycle, when the material may already have begun to cool and set. This reduces turbulence and other flow-related imperfections in the finished components and minimizes built in molecular stress occurring during the compression and curing process. The ability to drop plastic simultaneously through multiple nozzles allows material to be deployed more quickly into position and minimizes temperature drops and temperature variances across the surface of the material which could result in uneven shrinkage rates of the final part.

Conversely, certain component designs may be susceptible to localized shrinkage and/or warping because of particular features of the design. Corners and areas with significant surface feature density may have distinctly different cooling rates than other areas. In certain cases, it may be advantageous to induce certain component shrinkage at different rates by intentionally introducing molten plastic material at different temperatures in different sections of the component. Through temperature manipulation, the shrink rate of the molten plastic material may also be adjusted in certain sections, creating different physical and/or performance characteristics in different sections of the completed component. By controlling the quantity of material deposited in a particular areas of the mold, thus slightly varying its thickness and mass, it would be possible to induce varying shrink rates in that particular area relative to other areas, allowing for further improvement of final part quality.

Each mold is sequentially shuttled under the manifold system during each cycle and is positioned to receive the next stream of material from the manifold nozzles. Upon delivery of the molten material into the mold, the mold is shuttled back into the compression molding press and under the mating half of the mold and compressed at the desired pressure for the desired time until the part is formed. Subsequently, the pressed part is ejected and the mold is returned to a position under the filling station.

The apparatus is controlled by a central controller which is comprised of a computing device of a known type, having processor, memory and I/O capabilities. Central controller has inputs from various sensors throughout the system, including, without limitation, temperature, flow, positioning, pressure, and status sensors. The system may accommodate single molds or multiple molds in conjunction with a conveyor or transport system.

The central controller includes a variety of outputs, in addition to those intended for human monitoring, programming, adjustment and control. These include heat and extruder control, material handling and flow control circuits, gating control and position control. Optionally, an extruder and press control circuit is provided to the extent that the system is utilized to control the various phases of the process, including material processing and loading, material delivery and distribution and the compression phase of the molding process. Heat control is utilized to maintain optimal operating temperatures within the system and to vary flow within the system as required. Individual heat control zones may be provided for the extruder, delivery pipe, accumulator, manifold, and nozzle components of the system. Material handling relates to the sensing and dispensing of raw materials into and through the various components of the apparatus and the system, as well as the detection and positioning of molds for filling, compression, and transport.

All components of flow control and the integrated manifold are in electronic communication with the controller. The controller directs the flow of the molten plastic material from the extruder into the accumulator, or directly into the manifold, depending on the preferred method, which allocates the molten material to a plurality of dispensing nozzles through the use of independently operated, variable valves. The flow controller and integrated manifold, which may include a variety of independent or collectively assembled components, cooperatively provide the flow of molten plastic material from the extruder or accumulator, having variable flow rates and pressures, to the molds. The controller is programmed or manually operated to cause the valves to open, close or be positioned at an intermediate stage on an individual or zoned basis.

To the extent desired, molds may be positioned beneath the manifold and nozzles by a conveyor or other material handing device, controlled by the controller. A feedback loop permits the controller to position molds at the correct location with respect to the manifold for filling. In operation, the controller is programmed with a flow profile corresponding to the appropriate mold, which is positioned for filling by the system. The controller applies the appropriate flow profile to the flow controller and directs the respective manifold valves or nozzles to open to a position corresponding with the appropriate volume and/or rate of flow of molten plastic material. Material flows into the mold using both gravity and the pressure generated in the manifold from the extruder or optional accumulator. The manifold is designed to minimize any drop off in pressure resulting from the flow of material through multiple tubes, channels, gates or nozzles, thus maintaining enough pressure in the system to keep material flowing. It is to be specifically noted that a unitary mold is not required for the system to operate. A variety of molds, either identical or different, may be positioned under the manifold. Appropriate programming of the corresponding nozzle flow is then required to only fill the open cavities of the various molds.

An additional feature of the system is a multiphase material handling sequence in which the molding, pressing and extraction phases are sequentially arranged to maximize efficiency and throughput. The mold, which may be optionally positioned on a mold table, and an extraction table are affixed together. The use of a separable mold and mold table permits more flexibility for changing of the molds. The system provides a filling station, a pressing station and an extraction station, in sequence. The stations are arranged such that the mold and affixed extraction table are located in two of the three stations at any time. In a first phase, the mold is positioned in the filling station, while the extraction table is positioned in the pressing station. The mold is filled and moved to the pressing station. This moves the extraction table to the extraction station.

In operation, after the initial sequence to fill the mold for the first time, the press is designed for the upper half of the mold to retain a first molded component after pressing. The mold is moved back to the filling station and the extraction table returns to the pressing station. The first molded component is dropped onto the extraction table while the mold is being filled at the filling station with the molten plastic material for a second molded component. When the mold returns to the pressing station, the extraction table is returned to the extraction station. While the second molded component is being pressed, the material handling aspect of the system removes the first molded component from the extraction table in the extraction station. The mold then returns to the filling station for a third filling.

The flow control system, together with its particular features and advantages, will become more apparent from the following detailed description and with reference to the appended drawings.

DESCRIPTION OF THE PREFERRED EMBODIMENTS

Figure 1:
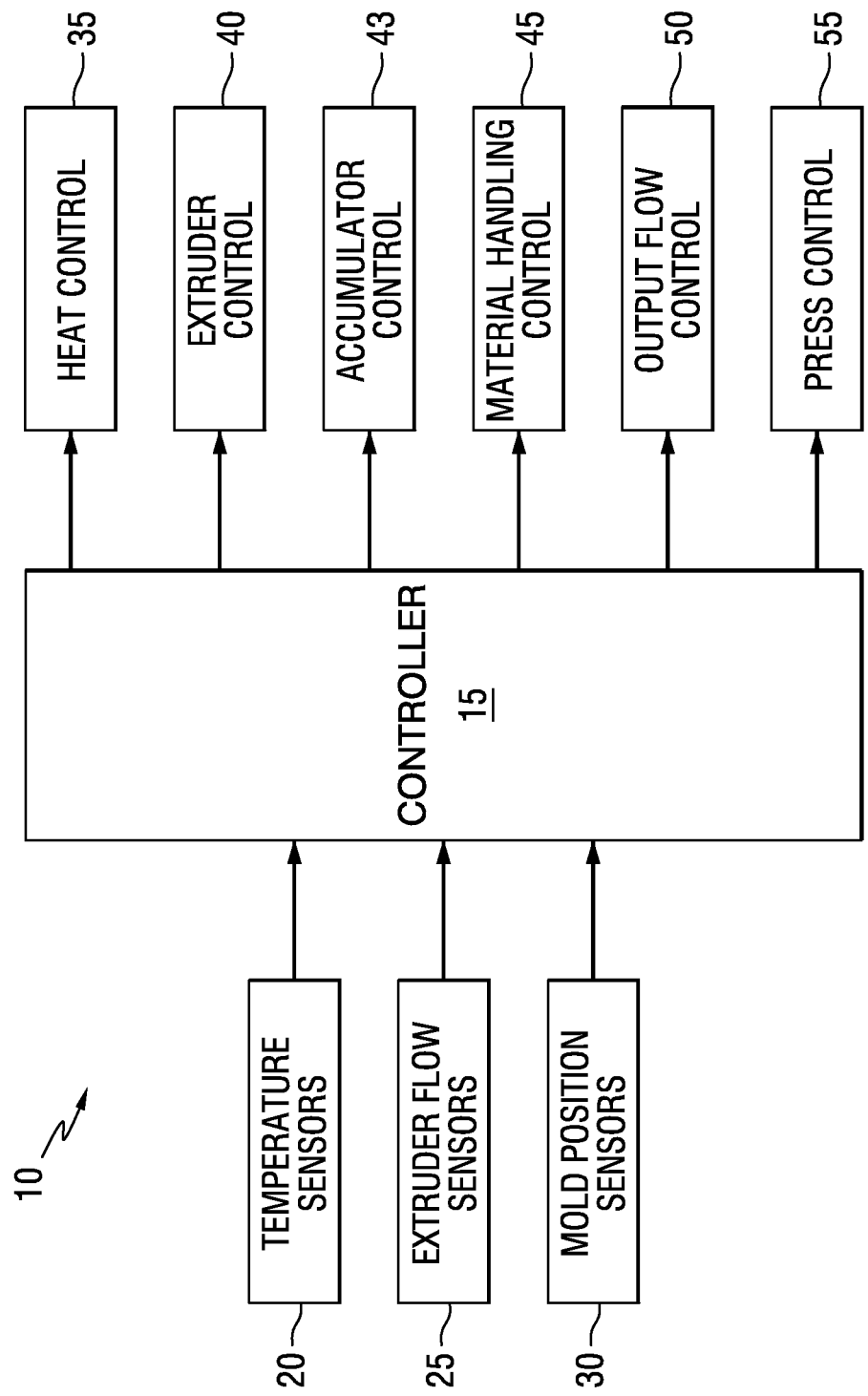
FIG. 1 is a diagrammatic view of the molding control system.
Figure 2:
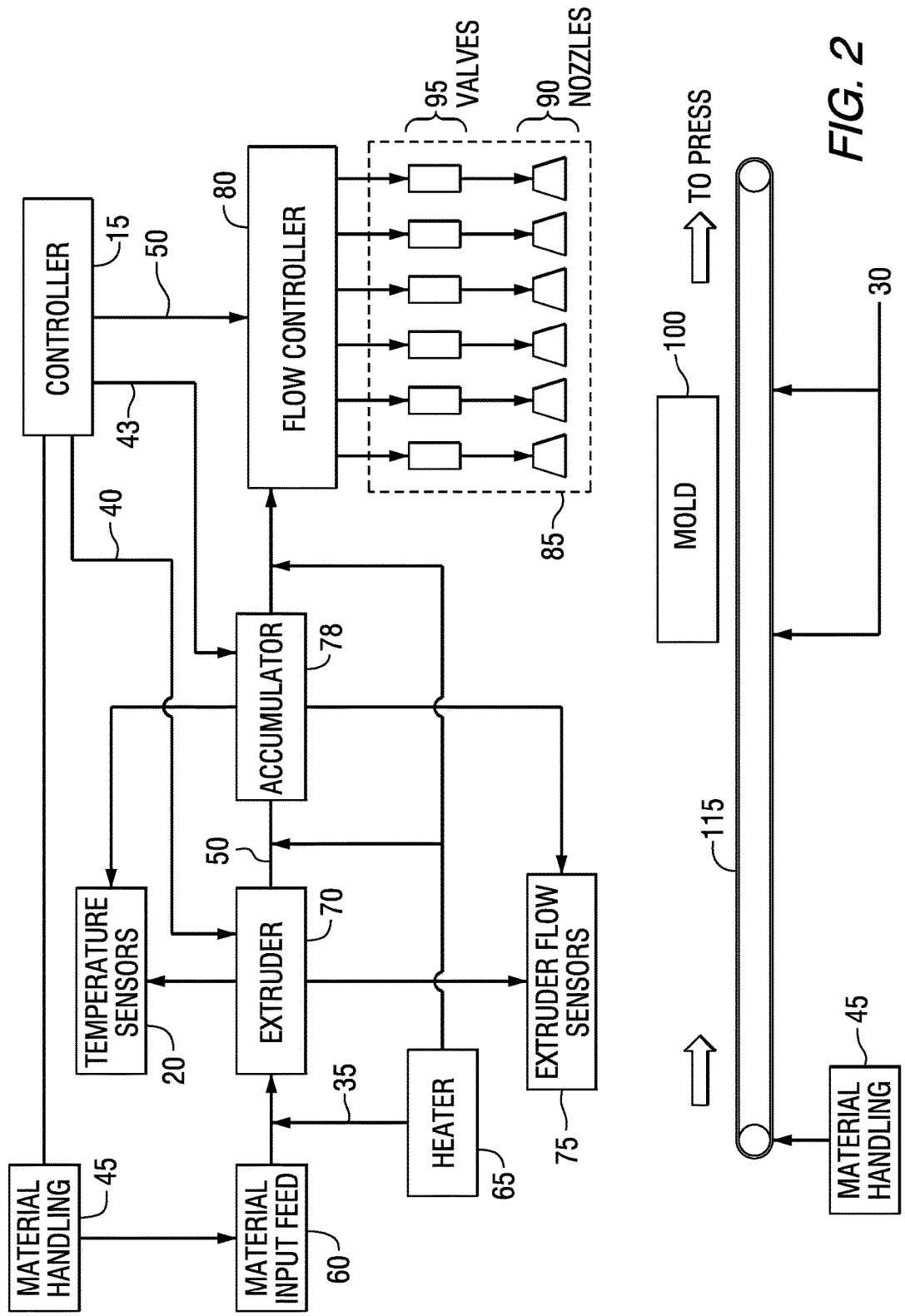
FIG. 2 is a schematic view of the molten material flow system and molding apparatus.
Figure 2A:
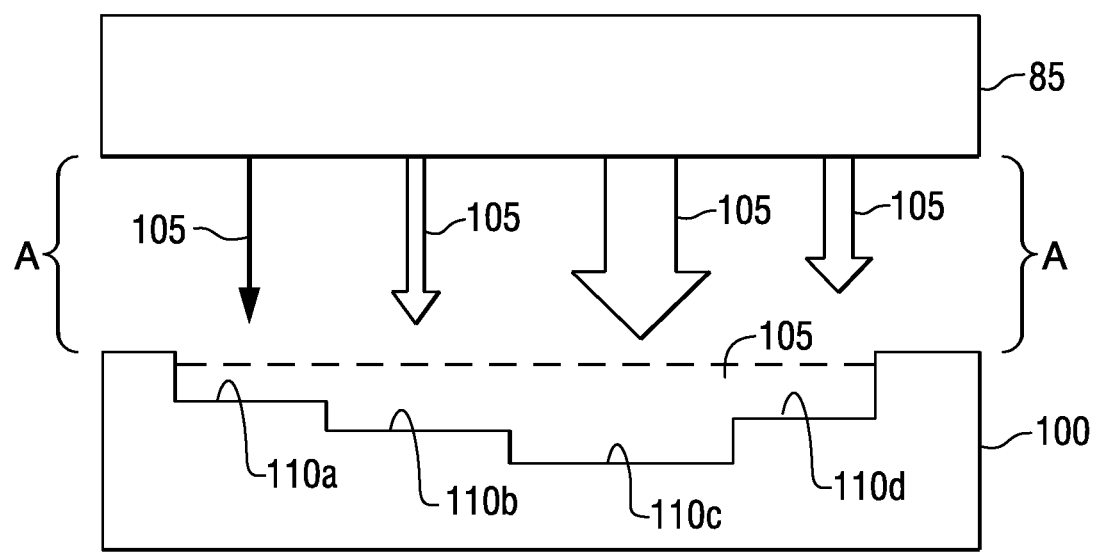
FIG. 2a is a diagrammatic side view of the filling operation of a mold.
Figure 3A:
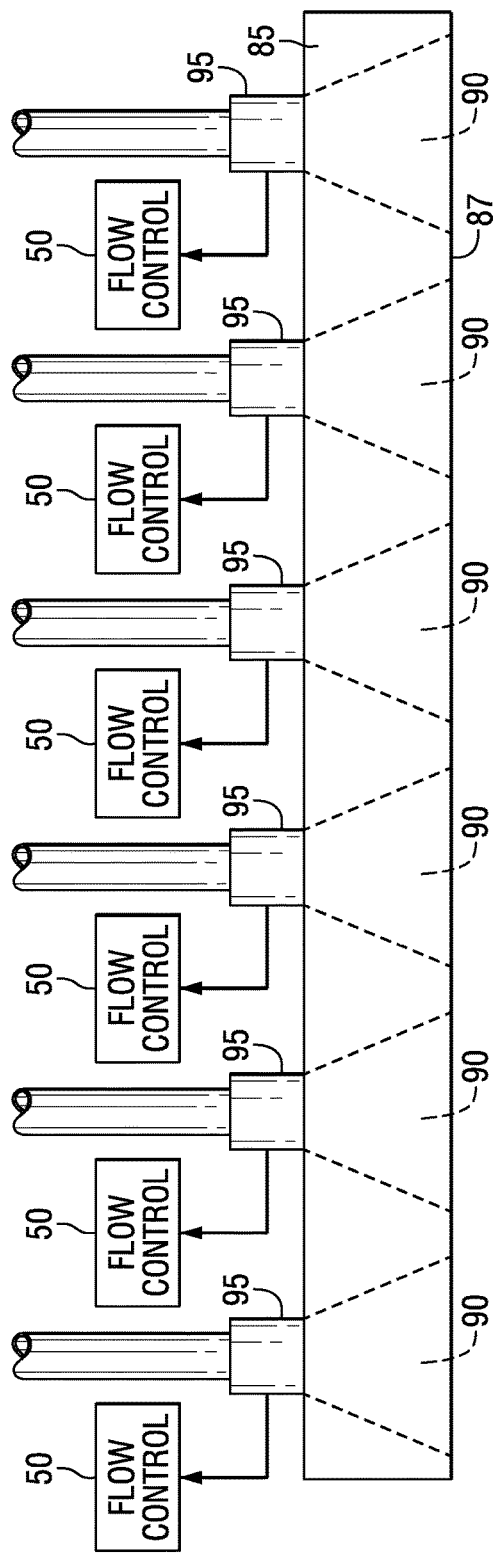
FIG. 3a is a side view, partially in section, of a flow controller.
Figure 3B:
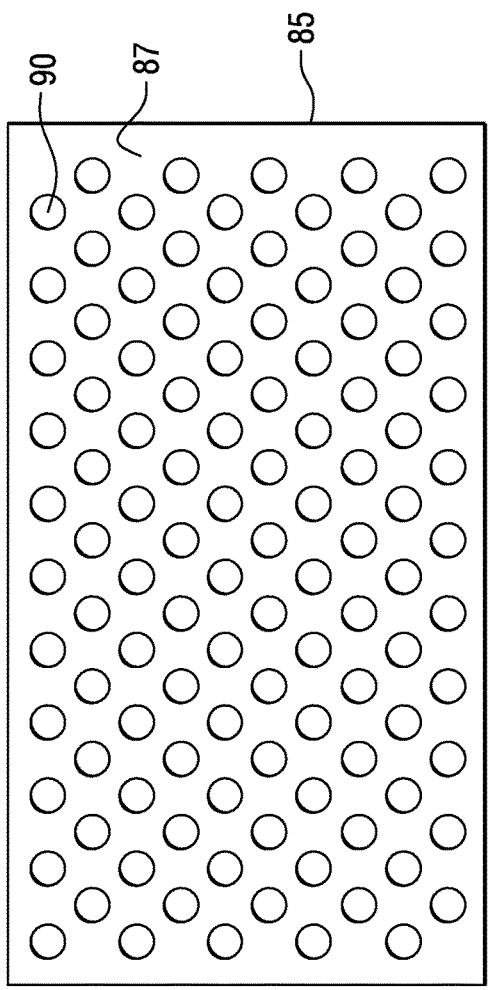
FIG. 3b is a bottom plan view of a flow controller.

Referring now to FIGS. 1 and 2, the system 10 is controlled by central controller 15. Central controller 15 is comprised of a computing device of a known type, having processor, memory and I/O capabilities. Central controller 15, in addition to human input devices for the purpose of programming and monitoring, has inputs from various sensors throughout system 10. These include temperature sensors 20, extruder flow sensors 25 and, optionally, mold position sensors 30. It is to be specifically noted that system 10 may be adapted for single mold use, in which a single mold is manually positioned for filling and no conveyor or other transport system is necessary. Extruder flow sensors 25 may additionally be positioned in conjunction with an optional accumulator 78 for downstream flow information.

Central controller 15 includes a variety of outputs, in addition to those intended for human monitoring, programming and control. Heat control circuit 35 is utilized to maintain adequate temperatures in the various components of system 10, as will be more fully described below. Heat control circuit 35 is designed to operate in conjunction with temperature sensors 20 to create a feedback loop for the maintenance of preselected temperatures within system 10. Extruder control circuit 40 is utilized to monitor the operating parameters of the extruder 70. Accumulator control circuit 43 is utilized to monitor the operating parameters of the accumulator 78. Accumulator control circuit 43 and extruder control circuit 40 are designed to operate in conjunction with extruder flow sensors 25. Material handling control circuit 45 is utilized to interface with any mold transport or conveyor 115 and operates in conjunction with mold position sensors 30. Output flow control circuit 50 is utilized to interface and control the flow control system for the molten plastic material as will be described more fully below. Press control circuit 55 is optionally provided to the extent that system 10 is utilized to control the pressing phase of the molding process.

Material input feed 60 is provided for the introduction of the raw, typically pelletized, plastic materials to the extruder. Typically, material input feed will include some type of hopper system which will permit the bulk loading and storage of the raw materials. While in most cases the frictional operation of the extruder is sufficient to form the molten plastic web of material from the raw pellets, an optional heater circuit 65 is provided. Heater circuit 65 is operated in conjunction with temperature sensors 20, heat control circuit 35 and controller 15. Extruder 70 receives the raw plastic material from material input feed 60 and converts it into the molten web of plastic material. Typically, extruder 70 utilizes an auger within a confined environment to frictionally engage the raw plastic, with or without additional heat, in order to form a web of preselected characteristics, including temperature, viscosity and curing. Extruder flow sensors 75 are provided to monitor the gross flow of the plastic web, as well as any particular characteristics of the plastic material necessary to ensure performance.

Accumulator 78 provides a variable volume repository for molten plastic material output from extruder 70. Extruder 70 provides a relatively constant flow of such molten plastic material which is temporarily stored in accumulator 78 under controlled temperature and pressure as dictated by accumulator control circuit 43. Accumulator control circuit 43 utilizes extruder flow sensors 25 and temperature sensors 20 at various points within the system 10 as input, regulating flowability and delivery of molten plastic material to the manifold 85. Accumulator 78 may be of any known design, so long as it is adapted to receive the molten plastic material and facilitate its delivery to the manifold 85.

Central to the operation of system 10 is flow controller 80 and manifold 85. While flow controller 80 and manifold 85 are described and illustrated as particular combinations of components, it is to be specifically understood that each component thereof may be assembled and operated separately. Flow controller 80 receives the molten plastic material from extruder 70 and allocates the molten material to a plurality of nozzles 90 through the use of valves 95. Each nozzle 90 is associated with an independently controlled valve 95 on a one to one basis. Valves 95 are in electronic communication with controller 15 through output flow control circuit 50. Valves 95 are solenoid controlled gate valves which have variable operating parameters, allowing full operational control of the flow there through from 0-100%. Heating components may be optionally added to valves 95 to ensure flowability of the molten plastic material or otherwise independently alter the temperature of the molten plastic material independently flowing through each of valves 95.

Referring now to FIGS. 2, 2a, 3a, 3b and 4, flow controller 80 and manifold 85 cooperatively provide the flow of molten plastic material having variable flow rates to mold 100. Flow controller 80 receives signals from controller 15 through output flow control circuit 50. Controller 15 is programmed or manually operated to cause valves 95 to open, close or be positioned at an intermediate stage on an individual basis. This permits the independent flow of molten plastic material 105 from each nozzle 90 in varying amounts and/or rates, as diagrammatically illustrated in FIG. 2a, through the use of varying width arrows A. This independent flow of molten plastic material 105 facilitates the complete, rapid and accurate filling of mold 100. Mold 100 is provided with a number of surface features 110, which are diagrammatically represented in a simple manner in FIG. 2a. It is well within the ambit of one skilled in the art to apply the principles identified herein to a mold of higher complexity. In any mold 100 having surface features 110a-d, a varying amount of molten plastic material 105 is preferentially added to mold 100 during the filling phase. Surface features, such as exemplified by surface feature 110c, which will result in a protruding section of the finished component, require a higher volume of molten plastic material 105 in the same filling period as a relatively flat portion of the finished component, exemplified by surface feature 110a. Flow controller 80 is directed to permit higher and lower flow volumes of molten plastic material 105 based upon the mapping of the relevant nozzles 90 and such surface features 110. This rapid and variable volume filling of mold 100 reduces filling time and turbulence within mold 100. Additionally, the uniform filling of mold 100 reduces setting while mold 100 is only partially filled.

As a matter of practicality, manifold 85 is sized and positioned above mold 100 and manifold face 87, containing the nozzles 90, extends peripherally in all directions to a size at least equal to mold 100, if not larger. A plurality of nozzles 90 are positioned above mold 100, with a density selected based upon the degree of control necessary to fill mold 100. It is to be specifically noted that the number and spacing of nozzles 90 are a design choice and manifold 85 may be designed to correspond with a particular mold 100 or a plurality of molds of varying types and designs. Nozzles 90 are sized and positioned, in conjunction with the flow capacity of valves 95, to provide rapid and even filling of mold 100, reducing the need for lateral flow of molten plastic material 105 from high surface features 110a to low surface features 110b, c. This reduces turbulence and other flow-related imperfections in the finished components.

Mold 100 may be manually or mechanically positioned below manifold 85 with manifold face 87 facing mold 100. It is to be specifically noted that mold 100, or a plurality of molds 100 may be sequentially located beneath manifold 85, but that one by one manufacturing of finished components is also contemplated. Mold 100 is statically positioned beneath manifold 85 during the filling operation, and there is no need or desire for any motion of the mold 100 during filling. To the extent desired, molds 100 may be positioned beneath manifold 85 by a conveyor 115 or other material handing device, controlled by controller 15 through material handling control circuit 45. In this manner, controller 15 can detect the position of mold 100 by receiving signals from mold position sensors 30. A feedback loop then permits controller 15 to position mold 100 at the correct location with respect to manifold 85 for filling, and move mold 100 to a press or other location subsequent to the filling operation as will be described below with particular reference to FIG. 4.

In operation, raw plastic material is added to material input feed 60, which then signals controller 15 through material handling control circuit 45 that the system 10 is ready for operation. The controller 15 will also receive signals from extruder 70 through extruder flow sensors 40 that the molten plastic material is flowing properly therethrough. Temperature sensors 20 permit controller 15 to monitor the condition of the flow and apply heat as necessary with heater 65 through heater control circuit 35. Controller 15 is programmed with a flow profile corresponding the appropriate mold 100, which is positioned for filling by system 10. Mold position sensors 30 may also be adapted to detect the type or design of the mold and signal the same to controller 15, identifying the appropriate flow profile for use with mold 100. Controller 15 applies the appropriate flow profile to flow controller 80 through output flow control circuit 50. Flow controller 80 directs respective valves 95 to open to a position corresponding with the appropriate volume and/or rate of flow of molten plastic material 105 and directs molten plastic material 105 into mold 100, positioned below manifold 85. Mold 100 is then directed, manually or automatically, away from manifold 85 and the next mold 100 is positioned for filling.

Figure 4:
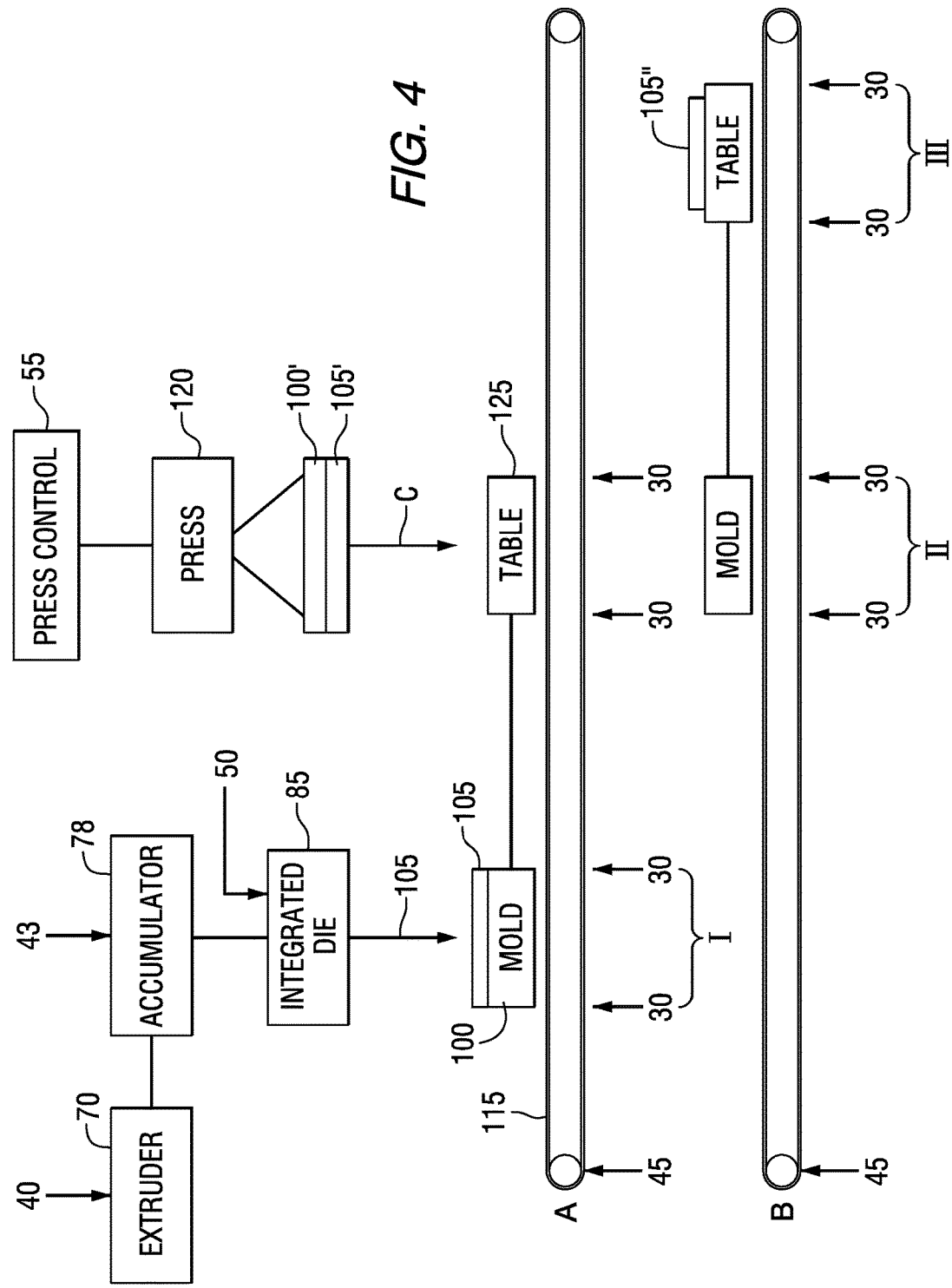
FIG. 4 is a diagrammatic view of the molding control system including a material handling sequence.

Referring now to FIG. 4, extruder 70 generates a flow of molten plastic material which is temporarily stored in and dispensed from accumulator 78 as monitored by controller 15 through extruder control circuit 40. Accumulator 78 accepts the molten plastic material and maintains it in accordance with preselected temperature and pressure parameters. Controller 15, in accordance with a preselected flow profile, signals accumulator 78, through accumulator control circuit 43, to release a volume of molten plastic material to manifold 85. Manifold 85, also in conjunction with said preselected flow profile, directs the molten plastic material 105 into mold 100, positioned below in filling station I. Mold 100 and extraction table 125 are mechanically affixed together to move as a single unit. Therefore, when mold 100 is positioned in filling station I, extraction table 125 is positioned in pressing station II. When mold 100 is positioned in pressing station II, extraction table 125 is positioned in extraction station III. At the time of filling, the mold 100/extraction table 125 unit is positioned in accordance with the diagram A portion of FIG. 4, a first filling position.

The volume of molten plastic material 105 is distributed within mold 100 and upon completion, mold 100 is moved to pressing station II, in accordance with the diagram B portion of FIG. 4, or from a first filling position to a second extraction position. Mold 100, being filled with molten plastic material 105 is moved to pressing station II, as detected by mold position sensors 30. Press 120 is constructed of any known type, and is typically a hydraulic or mechanical press. Operation of press 120 is controlled by controller 15 through press control circuit 55. Upon detection of mold 100 in pressing station II through mold position sensors 30, press 120 is operated to engage upper mold 100' with mold 100, encasing molten plastic material 105 therein. Mold 100 and/or upper mold 100' may be equipped with cooling or other temperature control means to reduce the temperature of mold 100, or mold 100 may be allowed to return to a set temperature by uncontrolled means. In either event mold 100 is equipped with appropriate temperature sensors which may be manually observed or interfaced with controller 15 through heat control circuit 35. Upon reaching a preselected target temperature, press 120 disengages upper mold 100' from mold 100. While the completed component may be permitted to rest within mold 100 for extraction, in the preferred embodiment, the completed component 105' is retained by upper mold 100' and raised out of mold 100.

At the point that completed component 105' is removed from mold 100, mold 100 is returned to filling station I from pressing station II through the action of conveyor 115 through material handling control circuit 45, and diagrammatically from diagram B to diagram A in FIG. 4, or from the second extraction position to the first filling position. Upon detection by mold position sensors 30 that mold 100 has returned to filling station I and that affixed extraction table 125 has returned to pressing station II, system 10 will initiate another filling sequence for mold 100 as described above. Simultaneously, press 120 will release completed component 105, which will either drop or be lowered in accordance with arrow C to extraction table 125. After the initial loading sequence, while conveyor 115 is the position indicated by diagram B of FIG. 4, extraction table 125 is positioned in extraction station III with completed component 105' loaded thereon. Completed component 105' may be removed from extraction table 125 by any appropriate manual or automatic material handling procedure. It is to be specifically noted that while an automated material handling system is disclosed, all of the steps associated with FIG. 4 may be performed manually.

The terms and expressions which have been employed herein are used as terms of description and not as limitation, and there is no intention in the use of such terms and expressions of excluding equivalents of the features shown and described or portions thereof, it being recognized that various modifications are possible within the scope of the invention claimed. Although particular embodiments of the present invention have been illustrated in the foregoing detailed description, it is to be further understood that the present invention is not to be limited to just the embodiments disclosed, but that they are capable of numerous rearrangements, modifications and substitutions.

What is claimed is:

1. A system for forming a molded component from molten plastic material, the system comprising:
   a source of molten plastic material;
   a mold having at least one open cavity at ambient pressure, each of said at least one open cavity having surface features defined therein, and each of said surface features defining areas of various cavity depths;
   a manifold in fluid communication with said source of molten plastic material, said manifold having:
      a manifold face that is at least the size of said mold, said manifold face disposed toward said mold; and
      a plurality of delivery ports mounted in said manifold face, said plurality of delivery ports arranged to collectively span the size of said mold when said mold is statically positioned beneath said manifold face, each of said delivery ports being aligned with at least one of said cavity areas when said mold is statically positioned beneath said manifold; and
   a controller in electrical communication with said delivery ports, said controller configured to direct each of said delivery ports independently, selectively, and variably relative to one another to deliver an amount of said molten plastic material to said at least one of said cavity areas when said mold is statically positioned beneath said manifold according to a flow profile specific to each of said delivery ports and said at least one of said cavity areas to dispense said molten plastic material at flow rates among said delivery ports sufficient to fill said at least one open cavity, and said controller configured to coordinate operation of said delivery ports to collectively deliver said molten plastic material to the entirety of said mold by various flow rates across each of said at least one open cavity so as to minimize lateral flow of said molten plastic material between said cavity areas.

2. The system of claim 1, wherein said source of molten plastic material is an extruder.

3. The system of claim 1, wherein said mold further comprises a plurality of molds aligned with said manifold face.

4. The system of claim 1, wherein said mold is the bottom component of a multi-component mold comprising a top component corresponding with said bottom component.

5. The system of claim 1, wherein said delivery ports are sized and spaced, and said flow profile for each of said delivery ports is varied, according to said surface features aligned with each of said delivery ports.

6. The system of claim 1, wherein a temperature of said molten plastic material is varied between selected ones of said delivery ports.

7. The system of claim 6, wherein said temperature of said molten plastic material from selected ones of said delivery ports is varied according to said surface features aligned with said selected ones of said delivery ports.

8. The system of claim 1, further comprising a reservoir for the temporary retention of said molten plastic material, said reservoir being in fluid communication with said source of molten plastic material and said manifold.

9. The system of claim 8, wherein said reservoir maintains said molten plastic material at a preselected temperature.

10. The system of claim 1, wherein said controller is in electrical communication with and electronically controlling said delivery ports and said source of molten plastic material.

11. The system of claim 10, further comprising:
at least one sensor positioned to detect at least one of: (i) a flow of molten plastic material from said source of molten plastic material and (ii) temperature,
wherein said controller is in electronic communication with said at least one sensor and said controller is configured to direct said flow of molten plastic material into said at least one of said cavity areas of said mold.

12. The system of claim 11, wherein said at least one sensor detects the temperature of said molten plastic material prior to flow of said molten plastic material into said mold, and said controller further monitors and maintains the temperature of said molten plastic material prior to said flow of molten plastic material into said mold.

13. The system of claim 11, further comprising at least one control circuit for positioning said mold with respect to said manifold.

14. The system of claim 11, further comprising at least one control circuit for controlling the operation of said source of molten plastic material.

15. The system of claim 11, further comprising at least one control circuit for controlling the operation of a press in electronic communication with said at least one control circuit.

16. A system for the sequential forming of a plurality of products from molten plastic material, the system comprising:
a source of molten plastic material;
a manifold in fluid communication with said source of molten plastic material, said manifold configured to deliver a selected flow of said molten plastic material therefrom;
at least one mold, each of said at least one mold defined by a first mold component forming a bottom of said mold and a corresponding second mold component forming a top of said mold, said first mold component of each of said at least one mold configured to receive said molten plastic material;
at least one receiving table, each of said at least one receiving table affixed to and spaced apart a preselected distance from a corresponding one of said first mold component of each of said at least one mold;
a press having said second mold component of said at least one mold; and
a material handling system configured to simultaneously translate one of said first mold component of said at least one mold with a corresponding one of said affixed and spaced apart receiving table between: (i) a first position for filling one of said first mold component of said at least one mold with molten plastic material from said manifold while depositing a separate first finished molded product onto said corresponding receiving table from one of said second mold component of said at least one mold, and (ii) a second position for forming a second finished molded product between said one first and second mold components while removing said first finished molded product from said corresponding receiving table.

17. The system as described in claim 16, further comprising: at least one filling station, each of said at least one filling station having one of said manifold;
at least one pressing station, each of said at least one pressing station having one of said press; and
at least one extraction station,
wherein said first position is further defined as when each of said at least one first mold component of said at least one mold is located at one of said at least one filling station and each of said at least one receiving table is located at one of said at least one pressing station, and said second position is further defined as when each of said at least one first mold component of said at least one mold is located at one of said at least one pressing station and each of said at least one receiving table is located at one of said at least one extraction station.

18. The system as described in claim 17, wherein in said second position said at least one receiving table engages a second material handling system at said at least one extraction station, said second material handling system removing a respective finished product from each of said at least one receiving table.

19. The system as described in claim 16, wherein said second mold component of each of said at least one mold retains said first and second finished molded products subsequent to forming said first and second finished molded products and prior to depositing said first and second finished molded products onto said at least one receiving table.

20. The system as described in claim 16, further comprising:
at least one sensor, each of said at least one sensor positioned to detect at least one of: a position of said material handling system, said flow of said molten plastic material into said first mold component of said at least one mold, and a status of said press; and
a controller, in electronic communication with said at least one sensor and at least one of: (i) said source of molten plastic material, (ii) said manifold, (iii) said material handling system, and (iv) said press, said controller causing the translation of said first mold component of said at least one mold with said at least one receiving table between said first position and said second position.

21. The system as described in claim 20, wherein said controller is also in electronic communication with a second material handling system for removal of said finished material from said at least one receiving table.

* * * * *